(12) United States Patent
Rondinone et al.

(10) Patent No.: US 11,420,640 B2
(45) Date of Patent: Aug. 23, 2022

(54) METHOD FOR AUTONOMOUSLY OPERATING A VEHICLE, CONTROLLER DEVICE FOR A VEHICLE, AND VEHICLE

(71) Applicants: Hyundai Motor Company, Seoul (KR); Kia Motors Corporation, Seoul (KR)

(72) Inventors: Michele Rondinone, Frankfurt am Main (DE); Andreas Bopp, Hanau (DE); Alexander Elenberger, Wiesbaden (DE); Andy-Max Prill, Heusenstamm (DE)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 257 days.

(21) Appl. No.: 16/692,902

(22) Filed: Nov. 22, 2019

(65) Prior Publication Data
US 2021/0001867 A1 Jan. 7, 2021

(30) Foreign Application Priority Data
Jul. 1, 2019 (DE) .......................... 102019209619.0

(51) Int. Cl.
| | |
|---|---|
| *B60W 50/00* | (2006.01) |
| *G05D 1/00* | (2006.01) |
| *G05D 1/02* | (2020.01) |
| *H04W 4/48* | (2018.01) |

(Continued)

(52) U.S. Cl.
CPC .......... *B60W 50/00* (2013.01); *G05D 1/0088* (2013.01); *G05D 1/0212* (2013.01); *G08G 1/22* (2013.01); *H04W 4/46* (2018.02); *H04W 4/48* (2018.02); *G05D 2201/0213* (2013.01)

(58) Field of Classification Search
CPC ......... B60W 50/00; H04W 4/46; H04W 4/48; G05D 1/0088; G05D 1/0212; G05D 220/0213; G08G 1/22
See application file for complete search history.

(56) References Cited

U.S. PATENT DOCUMENTS

| | | | |
|---|---|---|---|
| 9,429,941 B2 | 8/2016 | Ohmura et al. | |
| 2013/0144465 A1* | 6/2013 | Shida ........................ | B60T 7/22 701/1 |

(Continued)

FOREIGN PATENT DOCUMENTS

WO 2017210200 A1 12/2017

*Primary Examiner* — Peter D Nolan
*Assistant Examiner* — Mikko Okechukwu Obioha
(74) *Attorney, Agent, or Firm* — Slater Matsil, LLP

(57) ABSTRACT

A method for operating an autonomously driving vehicle includes operating the vehicle in a first autonomous driving mode by means of a controller device based on sensor data captured by a sensor system of the vehicle, determining, from environmental data which includes at least the sensor data, presence of a handover condition at a handover location within a planned trajectory of the vehicle, establishing a data communication to a leading vehicle being operated in an autonomous driving mode to travel along a leading trajectory including the handover location, and operating the vehicle in a second autonomous driving mode based at least partially on first auxiliary data provided by the leading vehicle.

20 Claims, 4 Drawing Sheets

(51) Int. Cl.
  *H04W 4/46* (2018.01)
  *G08G 1/00* (2006.01)

(56) References Cited

U.S. PATENT DOCUMENTS

| | | | |
|---|---|---|---|
| 2016/0200321 A1* | 7/2016 | Yamada | G05D 1/021 |
| | | | 701/96 |
| 2017/0166207 A1 | 6/2017 | Darms et al. | |
| 2019/0179309 A1* | 6/2019 | Mizutani | B60K 28/02 |
| 2020/0183384 A1* | 6/2020 | Noh | B60W 60/0053 |

* cited by examiner

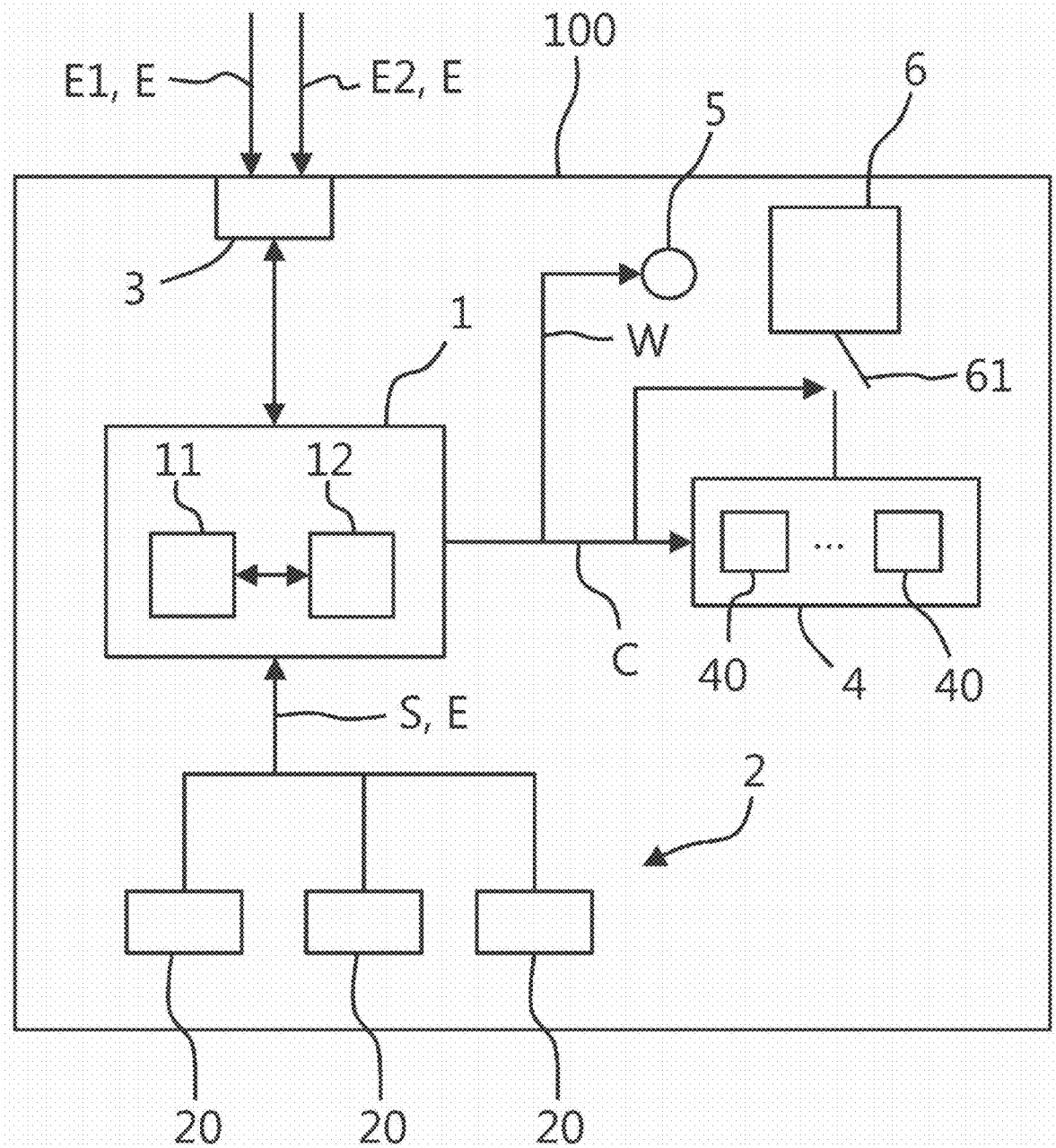

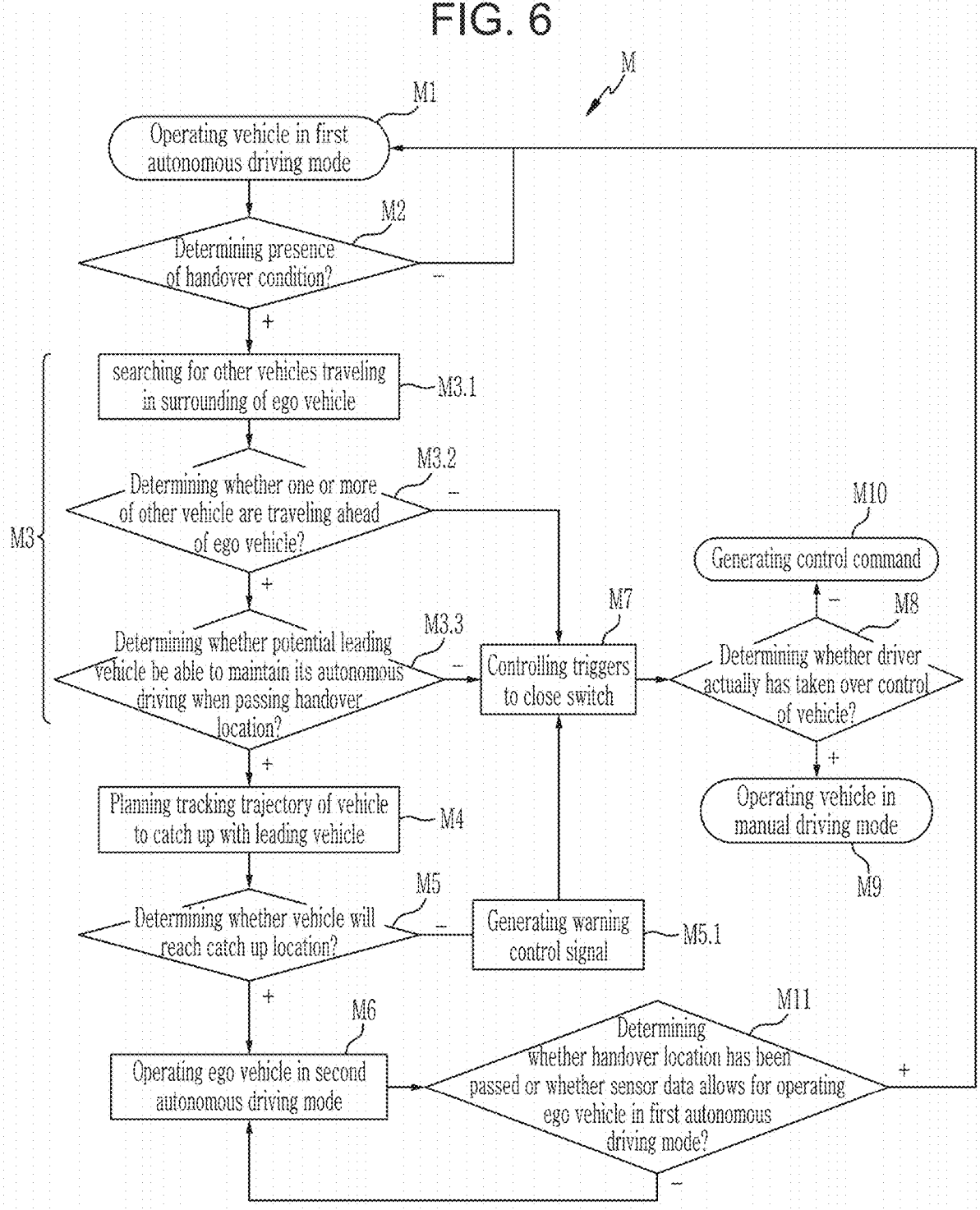

METHOD FOR AUTONOMOUSLY OPERATING A VEHICLE, CONTROLLER DEVICE FOR A VEHICLE, AND VEHICLE

CROSS-REFERENCE TO RELATED APPLICATIONS

This application claims priority to German Patent Application No. 102019209619.0, filed on Jul. 1, 2019, which application is hereby incorporated herein by reference.

TECHNICAL FIELD

Embodiments relate to a method for autonomously operating a vehicle, a controller for a vehicle and a vehicle.

BACKGROUND

Typically, in an autonomous driving mode, a vehicle is operated by a controller based on sensor data of a sensor system of the vehicle. Sensor data may include distance data, for example, a distance to a road marking and a distance with respect to other objects in the surrounding of the vehicle. In some situations, however, it is not possible to maintain the autonomous driving mode but instead the vehicle must be operated in a manual driving mode by the driver. This requires the controller to hand over control to the driver to prevent critical driving states. For example, such a hand over of control might be required where the sensor data of the vehicle is detected to be not as reliable as required, e.g., when fog occurs, when a sensor is damaged, or other. On the other hand, handing over control to the driver might be critical, too, for example when the driver is not prepared for manual driving.

Against this background, U.S. Pat. No. 9,429,941 B2 describes detection of whether a driver is able to manually drive the vehicle. If it is detected that the driver is not able to manually drive an emergency notification is transmitted to other vehicles and a leading vehicle accepts the notification. Then, the vehicle is controlled to follow the leading vehicle. U.S. 2017/0166207 A1 describes a method for controlling a vehicle driving in a platoon. WO 2017/210200 A1 describes a method for initiating a platoon.

SUMMARY

Embodiments of the invention relate relates to improvements in safety and comfort of autonomous driving vehicles such as cars, trucks, busses, and so on. In particular embodiments, the present invention relates to a method for autonomously operating a vehicle, a controller device for a vehicle, and a vehicle.

Embodiments of the invention can provide solutions for improving safety in automated driving vehicles, for example, with respect to situations where a need of transition between an automated or autonomous driving mode to a manual driving mode is determined.

A first aspect of the invention relates to a method for operating an autonomously driving vehicle. The method comprises operating the vehicle in a first autonomous driving mode by means of a controller device based on sensor data captured by a sensor system of the vehicle. The vehicle might be referred to as an ego vehicle. The sensor system may comprise radar sensors, LIDAR sensors, optical sensors such as cameras, and so on, wherein the sensors of the sensor system capture sensor data representing physical quantities such as distance relative to other objects or markings, velocity, acceleration, and so on. The controller device, in the first autonomous driving mode, based on the sensor data, generates command signals for actuating control actuators of the vehicle, such as a steering mechanism, a propulsion engine, a brake system or similar.

The method further comprises determining, from environmental data which includes at least the sensor data, presence of a handover condition at a handover location within a planned trajectory of the vehicle. The handover condition may be met, for example, when the sensor data exceeds a predetermined range required to maintain the first automated driving mode or when the controller is not able to process the captured sensor data. Environmental data may be provided exclusively by the sensor system or optionally further include data received from other vehicles in the surrounding. Thus, the handover condition is a condition where the actual sensor data is not sufficiently reliable or where the sensor data cannot be processed sufficiently reliable to maintain the first autonomous driving mode or where the sensor data is predicted to be not sufficiently reliable to maintain the first autonomous driving mode. For example, it might be detected that a viewing distance that can be sensed by a distance sensor is smaller than a predetermined threshold value for the actual velocity of the vehicle, e.g. due to fog, or that road markings used for determining a lateral distance of the vehicle to the roadside are not present. Another example for exceeding the predetermined range is that sensors deliver contradictive signals. Further, the environmental data may include information on conditions, such as weather, road marking or similar, in an area ahead of the vehicle. Thus, this information can be used to predict whether the sensors will be able to provide reliable sensor data or the controller will be able to process the sensor data in this area ahead. The planned trajectory of the vehicle is a track on the road ahead of the vehicle, wherein the controller device controls the vehicle to follow the planned trajectory in the first autonomous driving mode. The handover location corresponds to a location or site of the planned trajectory where the handover condition is predicted to be met or where the vehicle is required to be operated in a manual driving mode by the driver.

In a further step of the method, a data communication to a leading vehicle is established, the leading vehicle being operated in an autonomous driving mode to travel along a leading trajectory including the handover location. The leading vehicle, which is driving ahead of the ego vehicle, in its autonomous driving mode, is operated on sensor data provided by its sensor system, similar to the first autonomous driving mode of the ego vehicle. The leading vehicle, however, does not determine a handover condition or, in other words, is able to pass the location where the ego vehicle has determined presence of the handover condition in an autonomous driving mode in being controlled based on its own sensor data. The ego vehicle may determine presence of a suitable leading vehicle from status information continuously received from vehicles driving ahead of the ego vehicle, the status information indicating an operation mode of the respective vehicle ahead. Establishing a data communication includes establishing a wireless connection for at least receiving data by the ego vehicle from the leading vehicle and, optionally, for sending data from the ego vehicle to the leading vehicle.

The method further includes operating the ego vehicle in a second autonomous driving mode based at least partially on first auxiliary data provided by the leading vehicle. The first auxiliary data includes the leading trajectory of the leading car. In the second autonomous driving mode, the controller device controls the ego vehicle based at least partially on data received from the leading vehicle. In other words, the ego vehicle follows the leading vehicle which is able to pass the handover location in an automated driving mode without being required to handover control to the driver. In this second autonomous driving mode, the ego vehicle uses, at least partially, the leading trajectory provided by the vehicle and the controller controls the ego vehicle to follow this leading trajectory.

According to a second aspect of the invention, a controller device for autonomously operating a vehicle is provided. The controller device comprises a data processing unit, for example a CPU, an FPGA, an ASIC or similar, and a non-volatile data storage medium, such as a hard drive, a flash drive, a CD, a DVD, a Blu-ray® disc or similar. The data storage medium is readable by the data processing unit and stores software configured to cause the data processing unit to perform a method according to the first aspect of the invention.

A third aspect of the invention relates to a vehicle, for example an automobile, a lorry, a bus, or similar, the vehicle comprising a controller device according to the second aspect of the invention.

It is one of the ideas of the present invention to prevent transition from an automated driving mode to a manual driving mode of an ego vehicle by detecting a leading vehicle ahead of the ego vehicle that is able to pass a critical location where the transition would be required in an autonomous driving mode and to follow this leading vehicle. According to the invention, a data communication between the ego vehicle and the leading vehicle is established to receive reliable data such as a trajectory provided by the leading vehicle. The received auxiliary data is then used alone or in combination with sensor data of the ego vehicle for keeping controlling the ego vehicle in autonomous driving mode. The leading vehicle may be found by continuously receiving data from vehicles driving ahead of the vehicle. For example, auxiliary data may be received from a plurality of vehicles traveling ahead of the ego vehicle, wherein the auxiliary data includes status information of the vehicles ahead indicating whether the vehicles are able to pass the handover location in the autonomous driving mode. Said status information may also be contained in the environmental data, when the environmental data is partially received from other vehicles as will be explained in more detail below.

One particular advantage of the present invention is that, due to the received auxiliary data, the ego vehicle is able to maintain an autonomous driving state without need to hand over of control to the driver. This helps to reduce the probability that the driver is required to take over control in a situation when he is not sufficiently prepared. Thus, safety of autonomous driving is improved. Moreover, the driver is further supported by the autonomous driving modes since he can focus more on other tasks instead of being required to expect a transition of control.

Another advantage lies in that, effectively, at least two data sources are available for the ego vehicle when it receives auxiliary data from the leading vehicle. This improves the accuracy of the information used for automated driving. As a consequence, the sensors of the sensor system of the ego car may be realized less expensive.

Further embodiments of the present invention are subject of the further sub-claims and of the following description, referring to the drawings.

According to an embodiment, the presence of the handover condition is determined based on the sensor data, and wherein establishing the data communication to the leading vehicle comprises establishing a direct data link between a communication interface of the vehicle and a communication interface of the leading vehicle. According to this embodiment, the presence of the handover condition is directly derived from the sensor data as part of the environmental data. For example, it may be detected that in an area ahead of the vehicle road markings are missing or similar. For receiving the first auxiliary data from the leading car, a direct vehicle-to-vehicle communication is established. This is of particular benefit if a vehicle in the close surrounding of the ego car can serve as the leading car, whereby high data transfer rates are possible and a, thus, a fast transition from the first to the second autonomous driving mode is advantageously achieved.

According to another embodiment, the environmental data further includes second auxiliary data received via a data network to which the vehicle is connected, e.g. via a communication interface, the second auxiliary data being supplied to the data network by other vehicles including the leading vehicle, and wherein the presence of the handover condition is determined based on the second auxiliary data. According to this embodiment, the environmental data, in addition to the sensor data, further includes data, e.g. status information, provided by other vehicles in the surrounding of the ego vehicle which upload this data to a data cloud. The controller is connected to the data cloud and downloads data from the cloud as second auxiliary data. This second auxiliary data, then, is used to determine presence of a handover condition. Said status information may also be used to determine whether a vehicle ahead of the ego vehicle is a candidate to become the leading vehicle. For example, it can be determined from sensor data of vehicles ahead of the ego vehicle whether there is fog or other conditions that cannot be handled by the sensor system of the ego vehicle. In this context, determining presence of a handover condition may include comparing received sensor data of at least one vehicle driving ahead of the ego vehicle with boundary condition data of the sensor system of the ego vehicle, and determining presence of the handover condition when the received sensor data exceeds the boundary condition data. It is also possible that the second auxiliary data includes pre-processed data of other vehicles, e.g. a status information indicating presence of a hand over condition for a specific type of vehicle. One advantage of this embodiment is that handover conditions can be detected earlier.

According to a further embodiment, establishing the data communication to the leading vehicle comprises establishing a direct data link between a communication interface of the vehicle and a communication interface of the leading vehicle. As already indicated above, thereby, high data transfer rates can be advantageously achieved.

According to another embodiment, establishing the data communication to the leading vehicle comprises establishing a data link between a communication interface of the ego vehicle and a communication interface of the leading vehicle via the data network. According to this embodiment, data transfer between the ego vehicle and the leading vehicle is realized cloud based. This advantageously increases the distance over which the leading vehicle and the ego vehicle can communicate.

According to a further embodiment, the method comprises planning, based on the environmental data, a tracking trajectory of the ego vehicle to catch up with the leading vehicle, e.g., a trajectory so as to approach the leading vehicle up to a predetermined distance, and determining, based on a planned trajectory of the leading vehicle received as first auxiliary data and the planned tracking trajectory, whether the ego vehicle will reach a catch up location where the ego vehicle is predicted to having caught up with leading vehicle before reaching the handover location, wherein the ego vehicle is only operated in the second autonomous driving mode when it is determined that the ego vehicle will reach the catch up location before reaching the handover location. The idea of this embodiment is to check, in a one step, whether the leading car can be reached before the handover location is reached, and, in a second step, to operate the ego vehicle in the second autonomous driving mode only when the leading vehicle or leading car actually can be reached. Thereby, the second autonomous driving mode is avoided to be activated under possibly unsafe conditions. This further increases safety in the autonomous driving modes. Further, it can be determined earlier, in particular well before the handover location is reached, whether the driver needs to take over control.

According to this embodiment, the controller performs an analysis of dynamic data, such as current position, velocity, and heading direction of the leading vehicle, included in the first auxiliary data as the planned trajectory of the leading vehicle. The controller further checks whether a trajectory for the ego vehicle can be planned under the given boundary conditions, such as traffic, speed limits, sensor capability and so on, such that the ego vehicle can approach the leading vehicle to a specific distance before reaching the handover location.

Optionally, the vehicle is only operated in the second autonomous driving mode when it is determined that the ego vehicle will reach the catch up location before reaching the handover location and when the ego vehicle actually has caught up to the leading vehicle.

According to one embodiment, the control device generates a warning control signal when it is determined that the vehicle will not reach the catch up location before reaching the handover location. The warning control signal may cause a warning device to generate a warning signal, e.g., a visual, acoustic, optical, or haptic signal provided to warn the driver that he will be required to take over control of the vehicle. Thereby, the driver is advantageously allowed to prepare in good time before he needs to take over control.

According to a further embodiment, the first auxiliary data includes one or more of sensor data of the leading vehicle, velocity data of the leading vehicle, acceleration data of the leading vehicle, and status information indicating an operation mode of the leading vehicle. Velocity data and acceleration data may also form part of data representing the actual or planned trajectory of the leading vehicle.

The here described features for the device are also disclosed for the method and vice versa.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments, which are specified in the schematic figures, in which:

FIG. 5 shows a functional block diagram of an ego vehicle according to an embodiment of the invention; and FIG. 6 shows a flow diagram of a method according to an embodiment of the invention.

Unless indicated otherwise, like reference numbers or signs to the figures indicate like elements.

Figure 1:
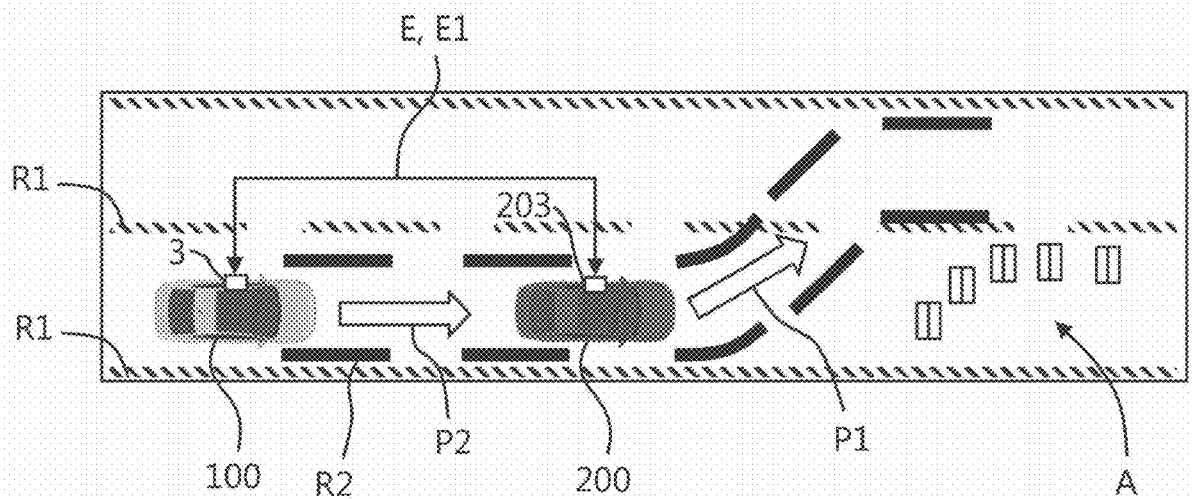
FIG. 1 shows a schematic top view to a road where an ego vehicle operated by a method according to an embodiment of the invention.

The following reference symbols can be used in conjunction with the drawings:

1 control device
2 sensor system
3 communication interface of the ego vehicle
4 control actuator system
5 waring device
6 manual control interface
9 data network
11 data processing unit
12 data storage medium
20 sensors
100 ego vehicle
200 leading vehicle
203 communication interface of the leading vehicle
300 other vehicles
A construction site area
C control command
E environmental data
E1 first auxiliary data
E2 second auxiliary data
M Method
M1-M11 method steps
R1, R2 road markings
S sensor data
W warning signal

DETAILED DESCRIPTION OF ILLUSTRATIVE EMBODIMENTS

FIG. 1 exemplarily shows a situation in which a first vehicle 100 and a second vehicle 200 are approaching a construction site area A. The first vehicle 100 and the second vehicle 200 are operated in a first autonomous driving mode. In the first autonomous driving mode, the vehicles 100, 200 are operated based on sensor data S captured by a sensor system 2 of the respective vehicle 100, 200. In this situation, it might occur that the first vehicle 100 is not able to maintain the first autonomous driving mode to maneuver around the construction site area A. This would require quitting the first autonomous driving mode to allow the driver to control or maneuver the first vehicle 100. On the other hand, the second vehicle 200 might be able to maneuver around the around the construction site area A in the first autonomous driving mode. It is one of the ideas of the invention to resolve this situation by establishing a data communication between the first vehicle 100 and the second vehicle 200 so as to allow the first vehicle 100 following the second vehicle 200 in a second autonomous driving mode, as will be explained in more detail below.

FIG. 5 exemplarily shows a functional block diagram of the first vehicle 100. The first vehicle 100, which will also be referred to as vehicle 100 or as ego vehicle 100 in the following, comprises a controller device 1, a sensor system 2, a communication interface 3, and a control actuator system 4. Further, an optional warning device 5 may be provided in the first vehicle 100.

The controller device 1 comprises a processing unit 11 and a data storage unit 12. The processing unit 11 is configured to generate control signals or commands C, e.g. in the form of electric or electromagnetic signals. The processing unit 11 may comprise one or more of a CPU, an FPGA, an ASIC or similar electronic signal processing devices. The data storage unit 12 is a non-volatile data storage medium such as a hard drive, a flash drive, a CD, a DVD, a Bluray® disc or similar. The data storage unit 12 is readable by the processing unit 11. Optionally, the processing unit 11 may also write data to the data storage unit 12. Generally, the data storage unit 12 may store a software program that is executable by the processing unit 11 and that causes the processing unit 11 to generate command signals C.

The sensor system 2 may comprise a plurality of sensors 20, for example distance sensors such as radar or LIDAR sensors, optical sensors such as cameras, velocity sensors, acceleration sensors, position sensors such as GPS sensors, and so on. The sensors 20 capture various physical quantities and generate sensor signals S representing these quantities. Generally, the sensor signals S may include at least a distance of the ego vehicle 100 relative to a roadside, which may be represented by road markings R1, R2, a distance of the ego vehicle 100 with respect to other objects in the surrounding, and an actual velocity of the ego vehicle 100. The sensors 20 of the sensor system 2 are connected to the controller device 1 so as to provide the sensor data S to the controller device 1. For example, a wire bound connection may be realized between the sensors 20 and the controller device 1 via a bus system, e.g. a CAN-Bus system.

The communication interface 3 of the ego vehicle 100 is provided for data exchange between the ego vehicle 100 and other vehicles 200, 300. In particular, the communication interface 3 is configured for wireless data exchange and may be, for example, a WIFI interface. The communication interface 3 is connected to the controller device 1 in order to provide received signals E1, E2 to the controller device 1 and, optionally, to transmit signals generated by the controller device 1.

The control actuator system 4 includes a plurality of actuators 40 for maneuvering and operating the vehicle. The actuators 40, which are merely symbolically shown as blocks in FIG. 5, may include for example a brake system, n propulsion engine, a steering column, and so on. The actuator system 4 is connected to the controller device 1, e.g., via a bus system such as a CAN-Bus system or in another suitable fashion allowing data communication.

The optional warning device 5 may be realized by a warning lamp, a speaker, or any other device configured to generate a visual, acoustic, and/or haptic warning signal. The warning device 5 is connected to the control device 1, e.g., via a wire bound data communication.

In the first autonomous driving mode, the controller device 1 generates command signals C based on the sensor data S provided by the sensor system 2. The command signals C cause the actuators 40 of the actuator system 4 to operate the vehicle 100 in a desired manner, in particular, so as to make the vehicle 100 follow a planned, predefined trajectory or path.

As schematically shown in FIG. 5, the vehicle 100 includes a manual control interface 6 allowing the driver of the vehicle 100 to manually control the actuators 40 of the actuator system 4 to maneuver the vehicle 100. As symbolically indicated by a switch 61 in FIG. 5, the control device 1 may hand over control of the actuating system 4 to the driver, e.g., when a condition occurs that does no longer allow the vehicle 100 to be controlled by the controller device 1 based on the sensor data S. Generally, this condition is referred to as handover condition in the following. The handover condition may for example be met when the sensor data S exceeds a predetermined range required to maintain the first automated driving mode. For example, in the situation in FIG. 1, one or more sensors 20 of the first vehicle 100 detect that there are two road markings R1, R2 present ahead of the vehicle 100 at a respective lateral distance to the vehicle 100. Thereby, sensor signals S may be generated that are contradictive and, thus, exceed a predetermined range.

In the following, a method M for operating an autonomously driving vehicle 100 is described by referring to the vehicle of FIG. 5. In particular, the data storage medium 12 of the control device 1 may store software configured to cause the data processing unit 11 of the control device 1 to perform the method M. FIG. 6 exemplarily shows a flow diagram of the method.

In step M1 of the method M, the vehicle 100 is operated in the first autonomous driving mode by means of the controller device 1 based on sensor data S captured by the sensor system 2 as described above.

In step M2, the controller device 1 determines from environmental data E presence of a handover condition at a handover location ahead of the ego vehicle 100, that is, within the planned trajectory of the vehicle 100. The environmental data E includes at least the sensor data S and, thus, may be provided by the ego vehicle 100 itself. Optionally, the presence of the handover condition is determined only based on the sensor data S. Further optionally, the environmental data may include data received via the communication interface 3. For example, the environmental data E may further include second auxiliary data E2 which includes data of other vehicles 200, 300 in the surrounding of the ego vehicle 100. As is symbolically indicated in FIG. 4 by a cloud, the second auxiliary data E2 may be received via a data network 9 to which the vehicle 100 is connected by the communication interface 3. The second auxiliary data E2 may include sensor data of sensors of the other cars 200, 300, data on weather conditions, street conditions such, and so on. The second auxiliary data E2 may also include and be provided as explicit notifications like "absence of lane markings", "presence of fog", "presence of a roadworks", "presence of an accident", and similar. Further, the second auxiliary data E2 may also include status information indicating the driving mode of the other vehicles 200, 300, i.e. "autonomous driving mode" or "manual driving mode". The other vehicles 200, 300 upload or supply these data to the data network 9. In this case, the controller device 1 may additionally or alternatively use the second environmental data E2 to determine presence of a handover condition ahead of the vehicle. For example, the controller device 1 may compare data provided by the sensor system of the second car 200 with sensor boundary data representing an operational limit for the sensors 20 of the sensor system 2 to determine whether sensors 20 of the sensor system 2 will be able to provide sensor data S required to maintain the first automated driving mode. The controller device 1 may also check received notifications with sensor or controller boundary conditions.

As is indicated by symbol "−" in FIG. 6, when the presence of the handover condition is not determined, the ego vehicle 100 is kept being operated in the first autonomous driving mode. If presence of a handover condition is determined as described above, the method proceeds to step M3, as indicated by symbol "+" in FIG. 6.

Figure 2:
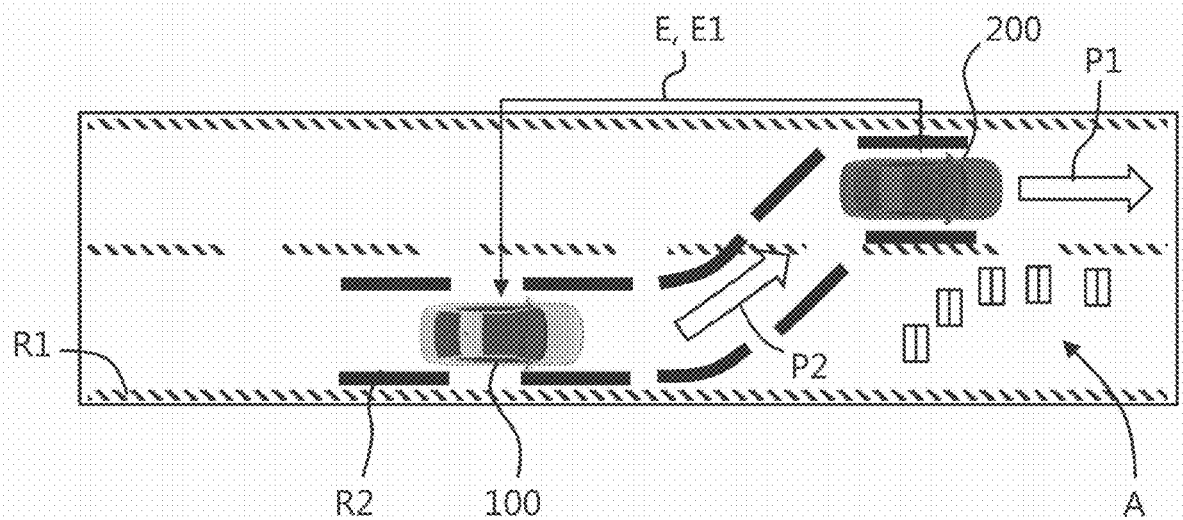
FIG. 2 shows the situation of FIG. 1 at a later point of time.
Figure 3:
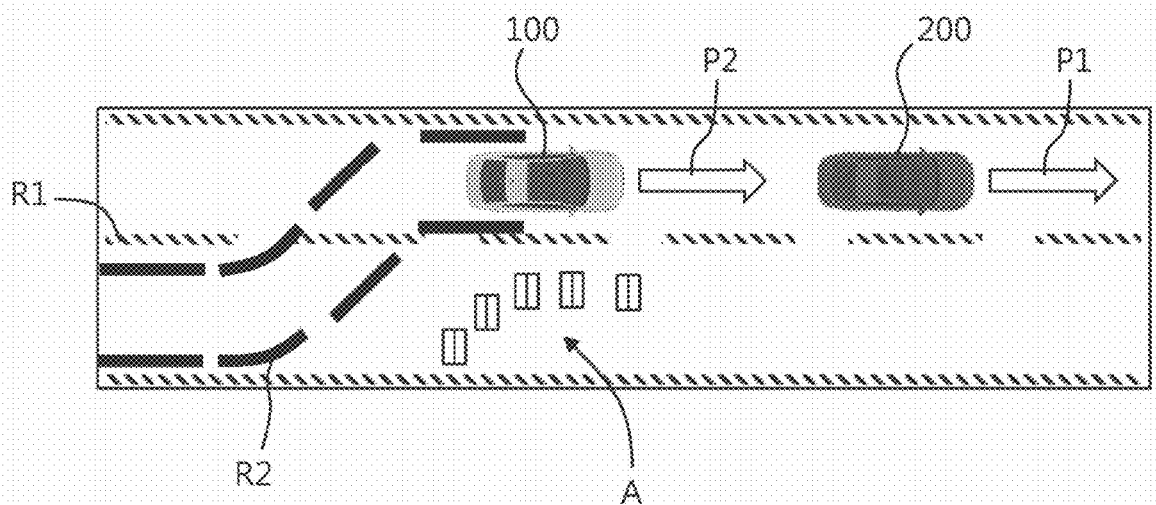
FIG. 3 shows the situation of FIG. 2 at a later point of time.
Figure 4:
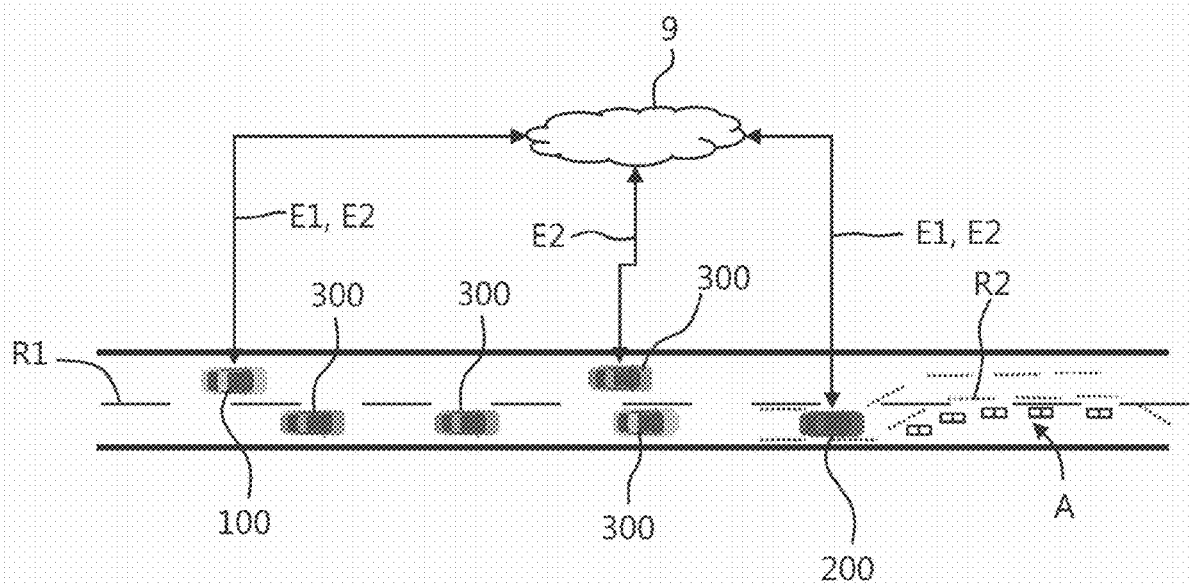
FIG. 4 shows a schematic top view to a road where an ego vehicle operated by a method according to a further embodiment of the invention.

In step M3, a data communication to the second vehicle 200 is established. The second vehicle 200 forms a leading vehicle 200 being operated in an autonomous driving mode to travel along a leading trajectory including the handover location. The data communication may be established as short range data communication directly between the communication interface 3 of the ego vehicle wo and a communication interface 203 of the leading vehicle 200 as indicated in FIGS. 1 to 3. Alternatively, establishing M3 the data communication to the leading vehicle 200 may comprise establishing a data link between the communication interface 3 of the vehicle wo and the communication interface 203 of the leading vehicle 200 via the data network 9 as is schematically illustrated in FIG. 4.

As is shown in FIG. 6, establishing M3 the data communication may include a step or phase M3.1 in which the ego vehicle wo searches for other vehicles 200, 300 traveling in the surrounding of the ego vehicle 100. For example, this step M3.1 may include receiving position signals of other vehicles 200, 300, either directly from the other vehicles 200, 300 or via the data network 9, as described above. In step M3.2, the ego vehicle determines whether one or more of the other vehicles 200, 300 are traveling ahead of the ego vehicle 100 and, therefore, form potential candidates to become a leading vehicle. Whether one of the vehicles 200, 300 driving ahead of the ego vehicle 100 is a potential candidate for becoming a leading vehicle may be determined from status information indicating a driving mode, e.g. "autonomous driving mode" or "manual driving mode", of the respective vehicle 200, 300. Only a vehicle that is able to pass the handover location in an autonomous driving mode may become the leading vehicle. If no other car 200, 300 can be determined in step 3.2 to be traveling ahead of the ego vehicle 100, as indicated by symbol "−" in FIG. 6, the method proceeds to step M7 in which the controller device 1 controls triggers to close switch 61 in FIG. 5 so as to hand over control to the driver, that is, to operate the vehicle 100 in a manual driving mode. When a potential candidate for becoming a leading vehicle 200 is detected among the other vehicles 200, 300 in step M3.2 as indicated by symbol "+" in FIG. 6, the method proceeds to step M3.3. In step 3.3, it is determined whether the potential leading vehicle 200 will be able to maintain its autonomous driving mode when passing the handover location. For example, this can be determined from the environmental data E which includes first auxiliary data E1 received from the potential leading vehicle 200, e.g. in the form of a status information indicating whether the potential leading vehicle 200 will be able to maintain its autonomous driving mode when passing the handover location or not. If it is determined that the potential leading vehicle 200 will be able to maintain its autonomous driving mode when passing the handover location, as indicated by symbol "+" in FIG. 6, the method proceeds to optional step M4. If it is determined that the potential leading vehicle 200 will not be able to maintain its autonomous driving mode when passing the handover location, as indicated by symbol "−" in FIG. 6, the method proceeds to step M7 as described above.

Step M7 is followed by step M8 in which the controller 1 determines whether the driver actually has taken over control of the vehicle 100 by controlling the actuator system 4 via the manual control interface 6. When the controller 1 determines that the driver actually has taken over control of the vehicle 100 the vehicle 100, as indicated by symbol "+" in FIG. 6, the vehicle 100 is operated in the manual driving mode as indicated by box M9 in FIG. 6. When the controller 1 determines that the driver did not take over control of the vehicle 100, e.g. within a predetermined amount of time, as indicated by symbol "−" in FIG. 6, the method M may proceed to step M10. In step M10 the controller device 1 generates a control command C causing the actuator system 4 to stop the vehicle 100.

In optional step M4, based on the environmental data E, a tracking trajectory of the vehicle 100 to catch up with the leading vehicle 200 is planned. In this step, the controller device 1 generates a tracking trajectory, including a geometric path which the ego vehicle 100 is supposed to follow, and travel velocities with which the ego vehicle 100 is supposed to travel along the geometric path.

In further optional step M5, the controller device 1 determines, based on a planned trajectory of the leading vehicle 200 received as first auxiliary data E1 and the planned tracking trajectory of the ego vehicle 100, whether the vehicle 100 will reach a catch up location where the vehicle 100 is predicted to having caught up with leading vehicle 200 before reaching the handover location. The catch up location may be defined by a location of the ego vehicle 100 where the ego vehicle 100, when following its planned trajectory, has approached the leading vehicle 200 up to a predetermined distance. That is, in step M5, it is determined whether the ego car 100 will be able to approach the leading vehicle 200 to a specific distance, when following its planned trajectory, before it reaches the handover location. If it is determined that the ego car 100 will not be able to approach the leading vehicle 200 to a specific distance, as indicated by symbol "−" in FIG. 6, the method M proceeds to step M7 as described above. Optionally, before proceeding to step M7, the control device 1 may generate a warning control signal W (step M5.1) causing the warning device 5 to generate warning signal W when it is determined that the vehicle 100 will not reach the catch up location before reaching the handover location. A warning control signal W, generally, may be generated before step M7 is entered, e.g. also after step M3.3 and step M3.2. If it is determined that ego car 100 will not be able to approach the leading vehicle 200 to a specific distance, as indicated by symbol "+" in FIG. 6, the method M proceeds to step M6.

In step M6, the ego vehicle 100 is operated in a second autonomous driving mode based at least partially on first auxiliary data E1 provided by the leading vehicle 200. In the second autonomous driving mode, the ego vehicle wo receives first auxiliary data E1 which include the current and/or planned leading trajectory of the leading vehicle. The first auxiliary data may for example also include sensor data captured by sensors of the leading vehicle 200 and/or current and planned speed and/or current and planned acceleration of the leading vehicle 200. That is, in the second autonomous driving mode, the processing unit 11 of the controller device 1 generates control commands C using at least partially data provided by the leading vehicle 200, e.g. in addition to sensor data provided by sensors 20 of the sensor system 2 of the ego vehicle 100.

In the situation in FIG. 1, the ego vehicle 100, after having established a data communication with the leading vehicle 200 as described above receives first auxiliary data E1 from the leading vehicle 200. In the example of FIG. 1, the first auxiliary data E1 is directly transmitted from the communication interface 203 of the leading vehicle 200 to the communication interface 3 of the ego vehicle 100. In the example in FIG. 4, the first auxiliary data E1 is uploaded to the data network or cloud 9 via the communication interface 203 of the leading vehicle 200 and the ego vehicle 100, via its communication interface 3, receives the data E1 from the data network 9.

As indicated by arrow P1 in FIG. 1, the leading vehicle 100 is operated in its autonomous driving mode to travel along a leading trajectory including the handover location. In the example of FIG. 1, the handover location might be determined as the beginning of the second road marks R2 and the leading vehicle 200 is maneuvered autonomously to maneuver around the construction site area A based on the captured position of the second road marks R2 by following a planned leading trajectory.

As shown in FIGS. 2 and 3, the ego vehicle 100 is able to follow the leading vehicle 200 in the second autonomous driving mode since it receives the first auxiliary data E1, namely the leading trajectory of the leading vehicle 200, which the controller device 1 uses to control and maneuver the ego vehicle 100. As indicated by arrow P2 in FIGS. 2 and 3, the ego vehicle wo follows the leading vehicle 200 in the second autonomous driving mode along the leading trajectory.

Optionally, the method may proceed further to step M11 in which the controller determines whether the handover location has been passed or, generally, whether the sensor data allows for operating the ego vehicle in the first autonomous driving mode. If this decision is positive, as indicated by symbol "+" in FIG. 6, the ego vehicle wo is again controlled to be operated in the first autonomous driving mode (step M1). If the decision is negative in step M11, as indicated by symbol "−" in FIG. 6, the ego vehicle wo is kept being operated in the second autonomous driving mode (step M6).

The invention has been described in detail referring to exemplary embodiments. However, it will be appreciated by those of ordinary skill in the art that modifications to these embodiments may be made without deviating from the principles and central ideas of the invention, the scope of the invention defined in the claims, and equivalents thereto.

What is claimed is:

1. A method for operating an autonomously driving vehicle, the method comprising:
   operating the vehicle in a first autonomous driving mode by using a controller device based on sensor data captured by a sensor system of the vehicle;
   determining, from environmental data that includes at least the sensor data, a presence of a handover condition at a handover location within a planned trajectory of the vehicle;
   establishing a data communication to a leading vehicle being operated in an autonomous driving mode to travel along a leading trajectory including the handover location;
   planning, based on the environmental data, a tracking trajectory of the vehicle to catch up with the leading vehicle;
   determining, based on a planned trajectory of the leading vehicle received as first auxiliary data and the planned tracking trajectory of the vehicle, whether the vehicle will reach a catch up location where the vehicle is predicted to having caught up with the leading vehicle before reaching the handover location, the first auxiliary data including the leading trajectory;
   when it is determined that the vehicle will not reach the catch up location before reaching the handover location, continuing to operate the vehicle in the first autonomous driving mode; and
   when it is determined that the vehicle will reach the catch up location before reaching the handover location, operating the vehicle in a second autonomous driving mode based at least partially on the first auxiliary data provided by the leading vehicle.

2. The method according to claim 1, wherein the presence of the handover condition is determined based on the sensor data, and wherein establishing the data communication to the leading vehicle comprises establishing a direct data link between a communication interface of the vehicle and a communication interface of the leading vehicle.

3. The method according to claim 1, wherein the environmental data further includes second auxiliary data received via a data network to which the vehicle is connected, the second auxiliary data being supplied to the data network by other vehicles including the leading vehicle, and wherein the presence of the handover condition is determined based on the second auxiliary data.

4. The method according to claim 3, wherein establishing the data communication to the leading vehicle comprises establishing a direct data link between a communication interface of the vehicle and a communication interface of the leading vehicle.

5. The method according to claim 3, wherein establishing the data communication to the leading vehicle comprises establishing a data link between a communication interface of the vehicle and a communication interface of the leading vehicle via the data network.

6. The method according to claim 1, wherein the first auxiliary data further includes sensor data of the leading vehicle, velocity data of the leading vehicle, acceleration data of the leading vehicle, or status information indicating an operation mode of the leading vehicle.

7. The method according to claim 1, wherein the vehicle is only operated in the second autonomous driving mode when it is determined that the vehicle will reach the catch up location before reaching the handover location.

8. The method according to claim 7, further comprising generating, by the controller device, a warning control signal when it is determined that the vehicle will not reach the catch up location before reaching the handover location.

9. A controller device for autonomously operating a vehicle, the controller device comprising:
   a data processing unit;
   a non-volatile data storage medium readable by the data processing unit, the data storage medium storing software configured to cause the data processing unit to perform a method comprising:
      when the vehicle is operating in a first autonomous driving mode based on sensor data captured by a sensor system of the vehicle, determining, from environmental data that includes at least the sensor data, a presence of a handover condition at a handover location within a planned trajectory of the vehicle;
      establishing a data communication to a leading vehicle being operated in an autonomous driving mode to travel along a leading trajectory including the handover location;
      planning, based on the environmental data, a tracking trajectory of the vehicle to catch up with the leading vehicle;
      determining, based on a planned trajectory of the leading vehicle received as first auxiliary data and the planned tracking trajectory of the vehicle, whether the vehicle will reach a catch up location where the vehicle is predicted to having caught up with leading vehicle before reaching the handover location, the first auxiliary data including the leading trajectory;

when it is determined that the vehicle will not reach the catch up location before reaching the handover location, causing the vehicle to be continue being operated in the first autonomous driving mode; and when it is determined that the vehicle will reach the catch up location before reaching the handover location, causing the vehicle to be operated in a second autonomous driving mode based at least partially on first auxiliary data provided by the leading vehicle.

10. The controller device according to claim 9, wherein the data processing unit comprises a CPU or a FPGA.

11. The controller device according to claim 9, wherein the non-volatile data storage medium comprises a magnetic storage medium, an electronic storage medium or an optically-readable storage medium.

12. The controller device according to claim 9, wherein the data processing unit comprises an ASIC.

13. A vehicle comprising:
a sensor system;
a communication interface;
a controller device configured to:
when the vehicle is operating in a first autonomous driving mode based on sensor data captured by the sensor system of the vehicle, determine, from environmental data that includes at least the sensor data, a presence of a handover condition at a handover location within a planned trajectory of the vehicle;
cause the communication interface to establish a data communication to a leading vehicle being operated in an autonomous driving mode to travel along a leading trajectory including the handover location; and
plan, based on the environmental data, a tracking trajectory of the vehicle to catch up with the leading vehicle;
determine, based on a planned trajectory of the leading vehicle received as first auxiliary data and the planned tracking trajectory of the vehicle, whether the vehicle will reach a catch up location where the vehicle is predicted to having caught up with leading vehicle before reaching the handover location, the first auxiliary data including the leading trajectory;
when it is determined that the vehicle will not reach the catch up location before reaching the handover location, cause vehicle to be continue being operated in the first autonomous driving mode; and
when it is determined that the vehicle will reach the catch up location before reaching the handover location, cause the vehicle to be operated in a second autonomous driving mode based at least partially on first auxiliary data provided by the leading vehicle, the first auxiliary data including the leading trajectory.

14. The vehicle according to claim 13, wherein the communication interface is configured to communicate directly with the leading vehicle.

15. The vehicle according to claim 13, wherein the communication interface is configured to communicate with the leading vehicle via a network.

16. The vehicle according to claim 13, wherein the environmental data further includes second auxiliary data received via a data network to which the vehicle is connected, the second auxiliary data being supplied to the data network by other vehicles.

17. The vehicle according to claim 16, wherein the second auxiliary data includes environmental data from the leading vehicle.

18. The vehicle according to claim 16, wherein the presence of the handover condition is determined based on the second auxiliary data.

19. The vehicle according to claim 13, wherein the controller device is configured to generate a warning control signal when it is determined that the vehicle will not reach the catch up location before reaching the handover location.

20. The vehicle according to claim 13, wherein the first auxiliary data further includes sensor data of the leading vehicle, velocity data of the leading vehicle, acceleration data of the leading vehicle, or status information indicating an operation mode of the leading vehicle.

\* \* \* \* \*